Nov. 5, 1935.  A. KUHLMANN  2,020,194
ARRANGEMENT FOR PRODUCING A HELICAL FLOW OF FLUE GASES AND SIMILAR MEDIA
Filed July 8, 1932  2 Sheets-Sheet 1

Patented Nov. 5, 1935

2,020,194

UNITED STATES PATENT OFFICE 2,020,194

ARRANGEMENT FOR PRODUCING A HELICAL FLOW OF FLUE GASES AND SIMILAR MEDIA

Arthur Kuhlmann, Kiel, Germany

Application July 8, 1932, Serial No. 621,424

4 Claims. (Cl. 138—37)

This invention relates to an arrangement for producing a helical flow of flue gases and similar media. These flows are employed for preventing the depositing of flue dust in the flues, for removing foreign bodies from pipe conduits and for similar purposes. The known means employed for this purpose are open to considerable disadvantages inasfar as they offer considerable resistance to the induced or natural draught in the conduits because they cause a narrowing or reduction of the cross sectional area owing to the wall surfaces placed in the path of the flow. Moreover, the fitting of these means in the pipe conduits presents difficulties.

The invention has for its object to overcome these objections and to enable the entire cross sectional area of the pipe line to be employed without a reduction in its area being necessary as in the case of the known arrangements.

This object is attained in that in the pipe conduit an extended helical guide member adapted to the diameter of the pipe is arranged, the height of this member being equal to or smaller than half the diameter of the pipe. It is advisable to bend the helical guide member at one or more points towards the middle of the cross sectional area or to widen same relative to the remaining portion of the guide member. Even if the height of the helical guide member is smaller than the radius of the pipe cross sectional area, the entire cross sectional flow will be included in the helical current as the core of the flow is in direct connection with the current threads acted upon by the helical guide surfaces and is carried along thereby in the whirl.

When employing such an arrangement in fire tubes or the like, in which further tubes are often accommodated for the purpose of superheating the medium produced, it is advisable to screen the ends of the superheater tubes towards the helical guide member by fitting a screen, for example on the end of the guide member, by means of which screen the whirl of the flowing medium will be maintained without losing in intensity in spite of the presence of the superheater tubes.

Several embodiments of the invention are illustrated by way of example in the accompanying drawings in which:—

Figure 1:
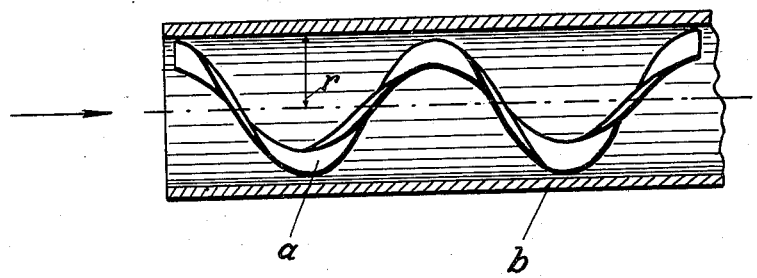
Fig. 1 shows in longitudinal section a length of pipe fitted with a guide member.
Figure 2:
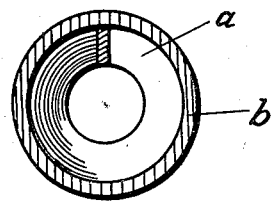
Fig. 2 is a cross section of Fig. 1.
Figure 3:
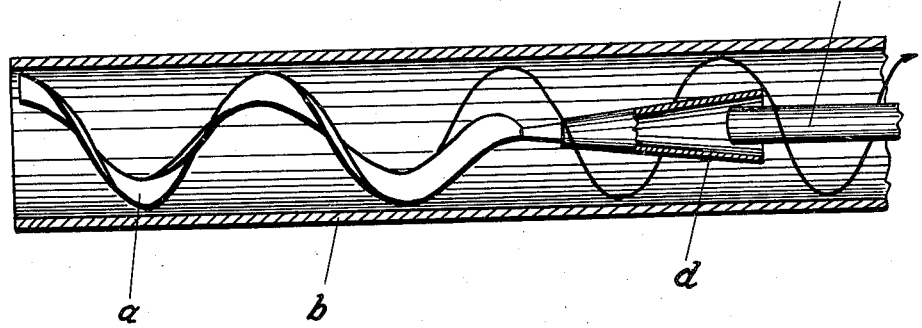
Fig. 3 shows in longitudinal section a pipe section with guide member and screen for a superheater tube fitted in the pipe conduit.
Figure 4:
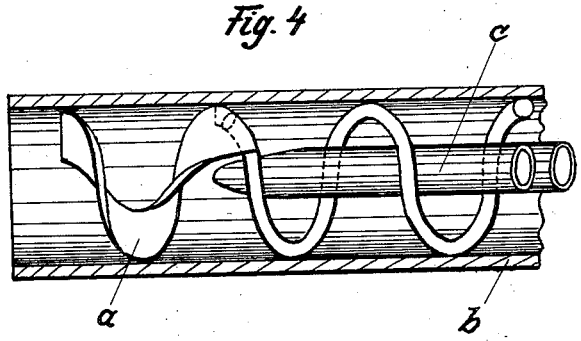
Fig. 4 is a longitudinal section of a pipe section in which the helical guide member is of less height in the range of the inserted fire tube than at other points.
Figure 5:
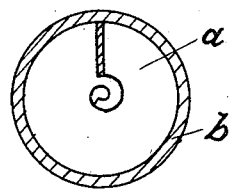
Fig. 5 is a cross section showing a pipe section in which the helical guide member is widened at one end relative to the remaining portion, towards the middle of the cross sectional area of the pipe.
Figure 6:
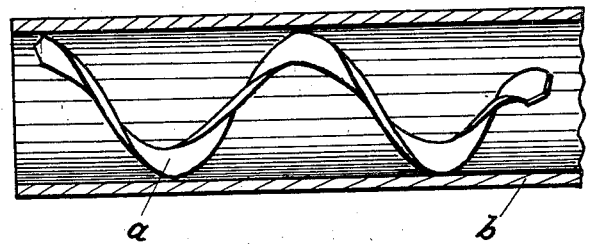
Fig. 6 shows in longitudinal section a pipe in which the helical guide member is bent inwards towards the middle of the pipe cross sectional area at one end.
Figure 7:
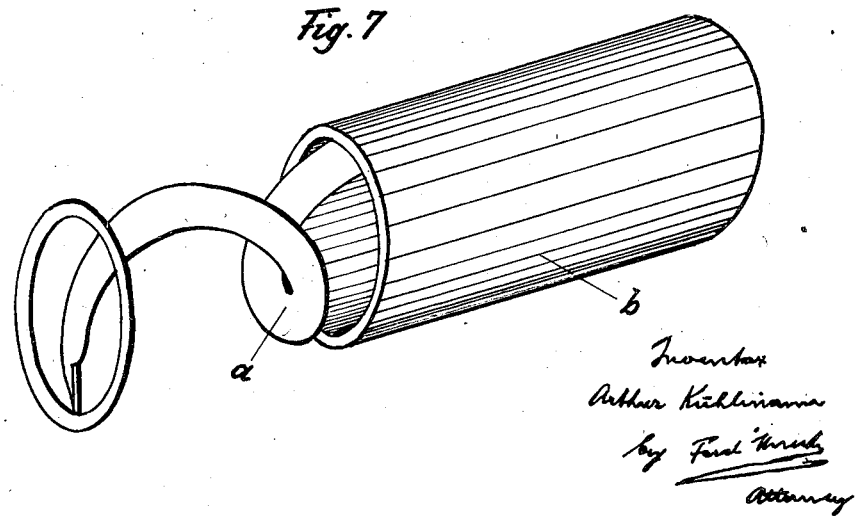
Fig. 7 is a perspective view showing a section of pipe with spiral and a protecting ring.

In Figs. 1 to 4 a guide member $a$ is shown which is of less height than the radius of the pipe $b$. The guide member forms an extended helical surface so that the flue gas or other medium flowing in longitudinal direction in the pipe $b$ receives a helical whirling movement. In order to maintain this helical movement around superheater tubes $c$, if these are present, it is advisable to fit a funnel-shaped guide member $d$ at the end of the guide member $a$ within the range of the superheater tube $c$, which funnel-shaped guide member deflects the flowing gas or other medium from the middle of the cross sectional area of the pipe $b$ towards the annular passage near the wall of the pipe and effects a uniform action and influencing of the superheater tube by the flowing gases. In this instance the guide member is made of less height within the range of the superheater tube, being extended for example in the form of a spiral wire or the like.

Where there is a danger of the cross sectional area left free by the spirals not being sufficiently influenced by the guide surface for the helical flow, owing to the greater speed of flow, the helical guide member is bent over at one or more points towards the middle of the pipe, for example as shown in Fig. 3, or is widened towards the middle of the pipe. Thus, all flow threads of the pipe cross section are directly whirled by the helical guide surface. The guide member at the points in question may be either bent in or widened. In order to ensure that the guide member will hold tightly in the pipe line without special fixing means, such as rivets, screws, welding or the like, it is advisable to make the outer diameter of the guide member larger than the inner diameter of the pipe conduit so that the guide member is inserted under compression in the pipe conduit and holds therein automatically.

Where the helical guide member is inserted at the commencement of a flue pipe, it is advisable to connect a protecting ring for the admission edge of the pipe, which is often very desirable, to the spiral and to hold this protecting ring against shifting in longitudinal direction of the pipe by means of a second ring.

The examples illustrated and described can be varied in numerous ways as regards their details so as to adapt same to the actual cases coming into question in practice, without departing from the scope of the invention.

Moreover the invention may be employed to equal advantage everywhere where it is desired to produce a turbulent flow of a medium in a pipe conduit without considerably reducing the flow cross sectional area by narrowing or restriction.

I claim:—

1. An arrangement for producing a helical flow of flue gases or other media in pipes, pipe conduits, etc., comprising a helical guide member providing an unobstructed longitudinal axial passage for the core of the flow, the guide member circumferentially bearing upon the inner wall of the pipe, the height of the helical member being in such a relative proportion to its pitch to the diameter of the pipe that the height is approximately equal to one quarter of the diameter and the pitch is approximately equal to the diameter of the pipe, and a deflecting screen at the end of the helical member extending over the middle of the cross sectional area of the pipe.

2. An arrangement for producing a helical flow of flue gases or other media in pipes, pipe conduits etc., comprising a helical guide member providing an unobstructed longitudinal axial passage for the core of the flow, the guide member circumferentially bearing upon the inner wall of the pipe, the height of the helical member being in such a relative proportion to the pitch and to the diameter of the pipe that the height is approximately equal to one quarter of the diameter and the pitch is approximately equal to the diameter of the pipe, a deflecting screen of funnel shape extending over the middle of the cross-sectional area of the pipe and pointed in a direction opposite to that of the flow of gases.

3. Means for accelerating the flow of gases through pipes comprising a helical guide member formed from a strip of flat metal twisted into a spiral of not more than three convolutions disposed in one end of the pipe for imparting a spiral flow to the gases with the major length of the pipe entirely free of obstructions whereby the turbulence imparted to the gas stream substantially eliminates the deposit of soot or the like on the inner face of the pipe.

4. Means for accelerating the flow of gases through pipes comprising a helical guide member formed from a strip of flat metal twisted into a spiral of not more than three convolutions disposed in one end of the pipe for imparting a spiral flow to the gases with the major length of the pipe entirely free of obstructions whereby the turbulence imparted to the gas stream substantially eliminates the deposit of soot or the like on the inner face of the pipe, the helical guide member providing an unobstructed longitudinal axial passage for the core of the flow and the pitch of the helical member being at least equal to the diameter of the pipe.

ARTHUR KUHLMANN.